United States Patent
Parla et al.

(10) Patent No.: US 9,137,211 B2
(45) Date of Patent: Sep. 15, 2015

(54) APPLICATION SERVICES BASED ON DYNAMIC SPLIT TUNNELING

(71) Applicant: Cisco Technology, Inc., San Jose, CA (US)

(72) Inventors: Vincent E. Parla, North Hampton, NH (US); Vlad Santau, Littleton, MA (US); Timothy Steven Champagne, Jr., So. Attleboro, MA (US); Kerry Hannigan Munz, Harvard, MA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 13/895,744

(22) Filed: May 16, 2013

(65) Prior Publication Data

US 2014/0344917 A1    Nov. 20, 2014

(51) Int. Cl.
*H04L 29/06*     (2006.01)
*H04L 29/12*     (2006.01)

(52) U.S. Cl.
CPC ........ *H04L 63/0272* (2013.01); *H04L 61/2007* (2013.01)

(58) Field of Classification Search
USPC ........................................... 726/15; 709/245
See application file for complete search history.

(56) References Cited

U.S. PATENT DOCUMENTS

| | | | |
|---|---|---|---|
| 7,987,506 B1 | 7/2011 | Khalid et al. | |
| 8,078,679 B2 | 12/2011 | Kajekar et al. | |
| 2002/0133534 A1* | 9/2002 | Forslow | 709/200 |
| 2012/0106488 A1* | 5/2012 | Nylander et al. | 370/329 |
| 2013/0018765 A1* | 1/2013 | Fork et al. | 705/34 |
| 2013/0258900 A1* | 10/2013 | Kokkinen et al. | 370/254 |

OTHER PUBLICATIONS

Aquila: adaptive resource control for QoS using an IP-based layered architecture; Engel et al; IEEE communication magazine, Jan. 2003, 8 pages.*

Enhancing dynamic cloud-based services using network virtualization; Hao et al; 2009, ACM; 8 pages.*

\* cited by examiner

*Primary Examiner* — Jason Lee
(74) *Attorney, Agent, or Firm* — Patterson + Sheridan, LLP

(57) ABSTRACT

In an example embodiment, a method of dynamically tunneling specific, or per application, services on demand without having to build complex split tunneling policies on Virtual Private Network (VPN) terminators. In particular embodiments, the method can allow for tunneling to multiple data centers on devices with limited, e.g., single, concentrator capabilities.

21 Claims, 6 Drawing Sheets

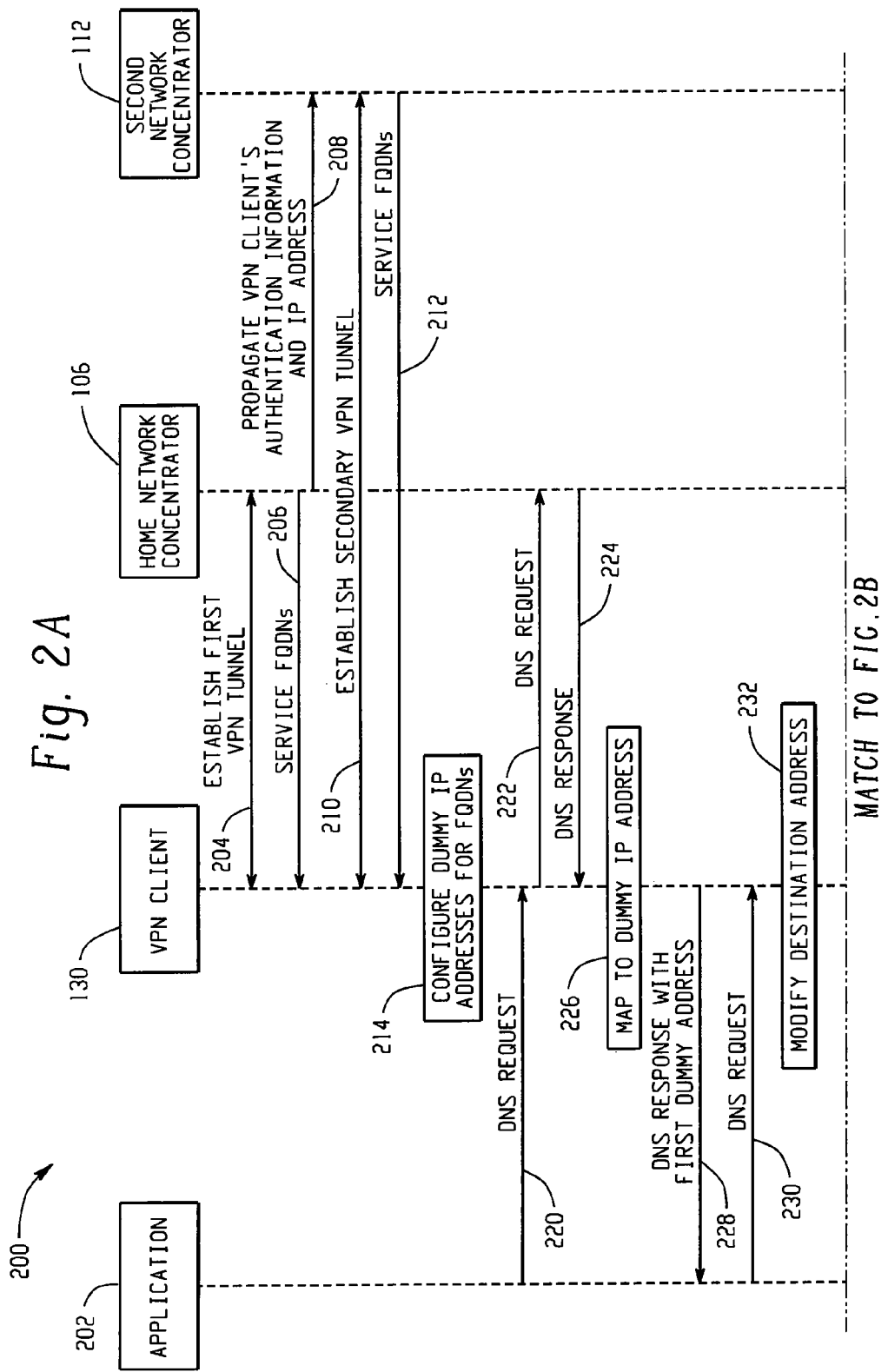

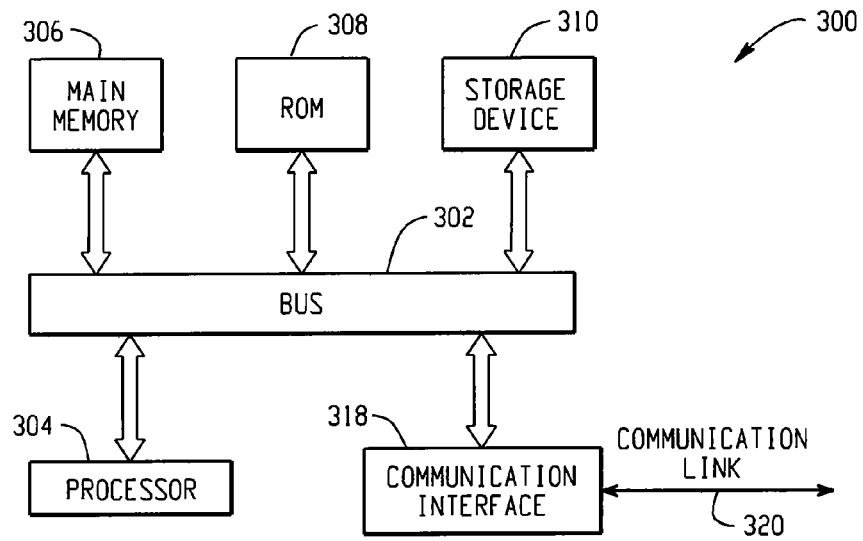
Fig. 3
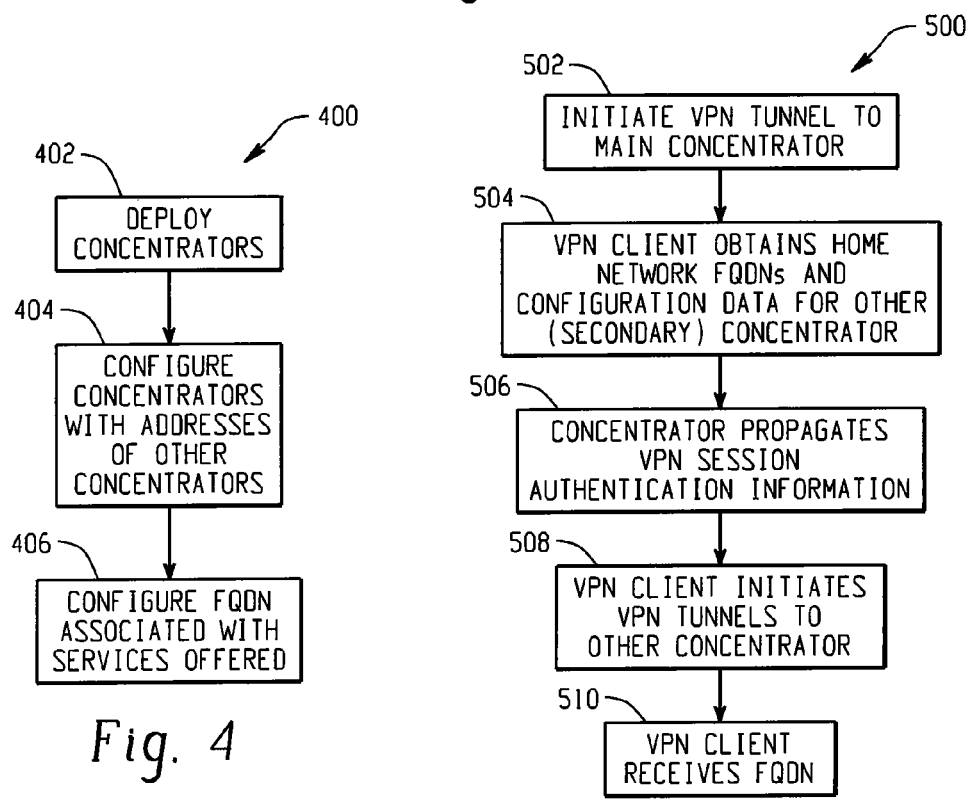
Fig. 4
Fig. 5

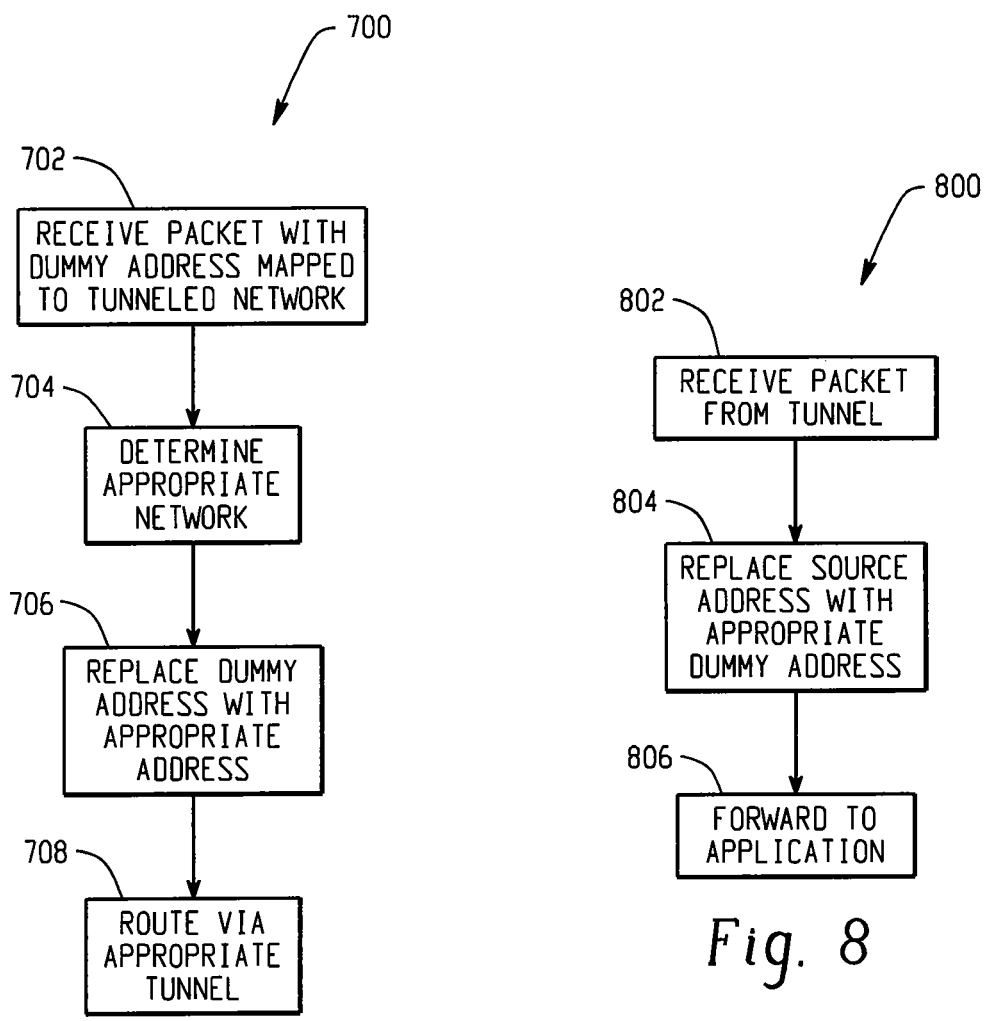

APPLICATION SERVICES BASED ON DYNAMIC SPLIT TUNNELING

TECHNICAL FIELD

The present disclosure relates generally to secure cloud computing.

BACKGROUND

With more services moving to the cloud, including private cloud data centers around the world, customers want to be able to provision a smart remote access solution that routes traffic based on application services instead of traditional routes to the appropriate data center. A traditional Virtual Private Network (VPN) tunnels all traffic. A split tunnel will allow access to certain network segments. The traditional split tunneling method is cumbersome and can result in very large split include/exclude VPN rules for a small set of services.

BRIEF DESCRIPTION OF THE DRAWINGS

The accompanying drawings incorporated herein and forming a part of the specification illustrate the example embodiments.

FIG. 2A and FIG. 2B illustrate an example of a simplified signal diagram for implementing dynamic split tunneling to multiple data centers.

FIG. 3 illustrates an example of a computer system upon which an example embodiment can be implemented.

FIG. 4 illustrates an example of a methodology for deploying VPN concentrators.

FIG. 5 illustrates an example of a methodology for establishing dynamic split tunnels to multiple data centers.

FIG. 7 illustrates an example of a methodology for processing a packet received from an application destined to a tunneled network.

FIG. 8 illustrates an example of a methodology for processing a packet received from a tunneled network.

OVERVIEW OF EXAMPLE EMBODIMENTS

Figure 1:
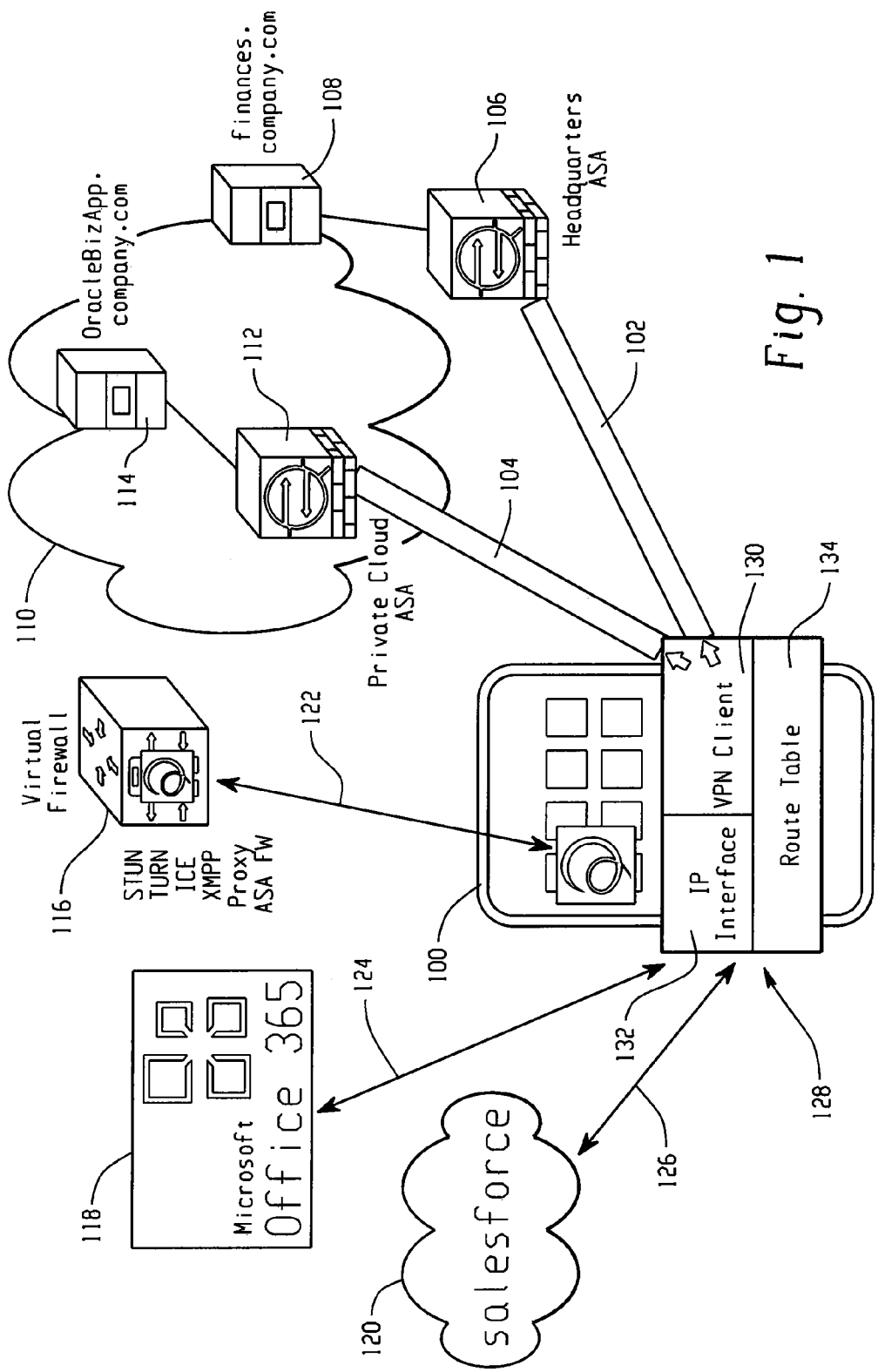
FIG. 1 illustrates an example of a mobile device implementing application services based on dynamic split tunneling to multiple datacenters.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein logic encoded in a tangible, non-transitory computer readable medium for execution by a processor, and when executed operable to obtain data representative of a service fully qualified domain name (FQDN) associated with a first tunnel. The logic is further operable to route traffic directed to the FQDN onto the first tunnel, and route traffic not directed to the FQDN elsewhere.

In accordance with an example embodiment, there is disclosed herein an apparatus comprising an interface and a virtual private network (VPN) client coupled with the interface. The VPN client selectively routes Domain Name System (DNS) request for sub-domains associated with a first network through a tunnel associated with the first network via the interface. The VPN client selectively routes DNS request for sub-domains associated with a second network through a tunnel associated with the second network via the interface. The VPN client replaces the destination address for DNS requests for sub-domains associated with the second network to match an address of a DNS server associated with the second network. The VPN client stores data representative of DNS requests for sub-domains associated with the second network. The VPN client forwards the DNS requests for sub-domains associated with the second network with the address of the DNS server associated with the second network. Other embodiments include a methodology and logic encoded in a computer readable medium operable to implement the functionality performed by the apparatus.

In accordance with an example embodiment, there is disclosed herein a computer implemented method comprising selectively routing Domain Name System (DNS) request for sub-domains associated with a first network through a tunnel associated with the first network and selectively routing DNS request for sub-domains associated with a second network through a tunnel associated with the second network. Service Internet Protocol (IP) addresses for sub-domains associated with the first and second networks are associated to dummy service IP addresses. The service IP addresses in DNS responses for sub-domains associated with the first and second networks are replaced with dummy service IP addresses, and the DNS responses are forwarded with the dummy service IP addresses. Other embodiments include an apparatus and logic encoded in a computer readable medium operable to implement the method.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, split tunneling rules are provisioned in terms of application service domain names. The remote access (RA) solution dynamically sends traffic associated with an application service to the appropriate data center in a secure manner (e.g., multiple tunnels for a plurality of data centers).

A concentrator, such as an Adaptive Security Appliance ("ASA" available form Cisco Systems, Inc. 170 West Tasman Dr., San Jose, Calif. 95134) or other VPN concentrator, is deployed at a first predefined data center (such as at a company's headquarters or home network) and at other data centers. The concentrators are configured with the addresses of the other concentrators. Concentrators are also configured with Fully Qualified Domain Names (FQDNs) associated with the services offered by their respective data centers (e.g., finances.company.com, BizApp.company.com).

When a VPN client initiates a VPN tunnel to the first predefined concentrator (such as a concentrator at a company's main headquarters), the VPN client receives the VPN configuration that also includes VPN configuration of other (peer) concentrators associated with various private cloud data centers along with the service FQDNs associated with the first predefined data center. Upon negotiating the VPN configuration with the client, the concentrator at the first predefined data center also propagates, in a secure manner, the VPN session's authentication information and client address (e.g., the IP address that will be assigned to the VPN adapter on the client host) to configured peer concentrators (e.g., ASAs deployed in the private cloud data centers).

The VPN client initiates a VPN tunnel to the peer concentrators that were received in the VPN configuration. Since the peer concentrators already have the VPN session's authentication information (received from the first predefined concentrator), no further user driven authentication is necessary (e.g., Single Sign On "SSO" is implemented with a secure token instead of user prompts). The VPN client receives from the peer concentrators, configuration data containing the service FQDNs associated with the respective private cloud data center application services.

In order to enforce tunneling based on the target FQDN, DNS traffic is routed to the appropriate tunnel associated with the sub-domain. In particular embodiments, DNS requests are routed to the VPN tunnel to the first predefined concentrator (e.g., to the home network).

For example, when a successful DNS response packet with a query string matching a service FQDN associated with a tunnel is detected arriving from a VPN tunnel, the embedded Internet Protocol (IP) address (e.g., the DNS name resolution result) is replaced with a dummy address. The dummy address is the address corresponding to the service FQDN. Consequently, the application receiving the resulting DNS response attempts to communicate with the aforementioned dummy address. The VPN client intercepts packets with the dummy address and replaces the destination address with the correct service IP address. The service IP address is the real address that was previously replaced in the DNS response packet.

The tunneled packet is sent to the concentrator where the service is configured. Similarly, when the VPN client detects a packet from the same VPN tunnel with a source address matching the same service IP address, the VPN client replaces the source address with the aforementioned dummy IP address. Any other (e.g., non-tunneled) traffic is sent in the clear via the physical adapter.

FIG. 1 illustrates an example of a mobile device 100 implementing application services based on dynamic split tunneling to multiple datacenters. In the illustrated example, mobile device 100 has a first VPN tunnel 102 established with a home (e.g., headquarters) ASA coupled with a first network (e.g., a first predefined data center) 106 and a second (or secondary) VPN tunnel 104 established with a private cloud ASA 112 (second network). Those skilled in the art should readily appreciate that there can be multiple secondary VPN tunnels. The illustrated example shows a single secondary tunnel merely for ease of illustration.

In the illustrated example, the mobile device 100 comprises a virtual VPN Adapter 128 that comprises a VPN client 130. The mobile device 100 further comprises a system route table 128, which is configured by the VPN client 130 so that certain traffic (e.g., traffic targeted to specific networks) is routed to its virtual VPN adapter (e.g., virtual VPN adapter 128, particular embodiments may suitably comprise multiple VPN adapters). Such traffic is retrieved by the VPN client 130 and then tunneled. Any other traffic is routed to the depicted physical IP interface 132 and sent in the clear (e.g., not via an encrypted tunnel).

In an example embodiment described herein, service based split tunneling is performed that employs domain names, not network address ranges. Therefore in an example embodiment that will be described in more detail herein, dummy IP address ranges, e.g., one per domain name) are employed. The VPN client 130 applies routes corresponding to these dummy address ranges, upon tunnel establishment. This ensures that traffic to these dummy addresses will be tunneled. As will be explained in more detail herein, address translation mechanisms employed by the VPN client 130 forces applications targeting the tunneled domain names to actually send packets to these dummy addresses, which get routed to the VPN adapter 128 and then properly tunneled.

Logic in the mobile device 100 employs the route table 128 to determine how to route outbound packets and handle inbound packets. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions. In an example embodiment, the VPN client 130 comprises logic to perform the functionality described herein.

In an example embodiment, VPN client 130 establishes a first tunnel 102 with a first network (e.g., a home or headquarters network). In the illustrated example, the tunnel 102 is established with an ASA 106, however, those skilled in the art should readily appreciate that the VPN client 130 may establish a tunnel with any suitable security device such as a VPN concentrator. In the illustrated example, the sub-domain finances.company.com is provided by a server 108 disposed on the first network.

Upon establishing the tunnel 102, the ASA provides the VPN client 130 FQDNs for sub-domains associated with the first network, and with a VPN configuration that includes data (such as an address, e.g., the FQDN or IP address of a VPN concentrator) for other (e.g., secondary) networks. The VPN client 130 establishes a second tunnel 104 to a second network 110 via ASA (or concentrator) 112. Upon establishing the second tunnel 104, the ASA 112 provides the VPN client 130 with FQDNs for sub-domains associated with the second network, which in this example is server 114 associated with OracleBizApp.Company.com. Those skilled in the art should readily appreciate that wildcards can be used for identifying sub-domains disposed on the first and second networks (such as *.cisco.com). As those skilled in the art can readily appreciate, the VPN client 130 may establish additional tunnels with additional secondary networks (not shown). There may be any physically realizable number of secondary networks coupled with VPN client 130.

In an example embodiment, the VPN client 130 allocates dummy service Internet Protocol (IP) addresses corresponding to the FQDNs associated with the first tunnel and allocates dummy service IP addresses corresponding to the FQDNs associated with the second tunnel. In particular embodiments, the dummy service IP addresses are contiguous.

In an example embodiment, the VPN client 130 intercepts and modifies DNS requests and responses for the first network and the second network. For example, a first DNS request for a sub-domain associated with a first FQDN associated with the first network (e.g., finances.company.com) is intercepted by VPN client 130. The VPN client 130 determines that the DNS request is for a sub-domain associated with the first network, and forward the first DNS request onto the first tunnel 102. The VPN client 130 receives a response to the first DNS request from the first tunnel 102. The response to the DNS request comprises a first service IP address associated with the first network. The VPN client 130 maps the first service IP address in the response to the first DNS request to a first dummy service IP address allocated to the FQDNs associated with the first tunnel. The VPN client replaces the first service IP address in the response to the first DNS request with the first dummy service IP address and forwards the response to the first DNS request with the first dummy IP address to the requestor (e.g., the application that initiated the first DNS request). The VPN client 130 intercepts a second Domain Name System (DNS) request for a sub-domain associated with a second FQDN associated with the second network (e.g., Oracle.BizApp.Com). The VPN client 130 forwards the second DNS request onto the second tunnel 104. The VPN client 130 receives a response to the second DNS request from tunnel 104. The response to the second DNS request comprises a second service IP address associated with the second network 110. The VPN client 130 maps the second service IP address in the response to the second DNS request to a second dummy service IP address allocated to the FQDNs associated with the second tunnel. The VPN client 130 replaces the second service IP address in the response to the first DNS request with the second dummy service IP address, and forward the response to the second DNS request with the second dummy IP address to the requestor (e.g., the application initiating the second DNS request).

In particular embodiments, such as, for example, where the operating system (OS) of the device 100 can only support a limited number of DNS server addresses (for example two), the VPN client 130 may perform some additional address translation on DNS requests and responses For example, the first network may have DNS servers with addresses of 1.1.1.1 and 2.2.2.2, and the second network may addresses of 3.3.3.3 and 4.4.4.4. If the OS can only support two IP addresses, then the default DNS addresses of 1.1.1.1 and 2.2.2.2 will be installed. However, because these servers are disposed on the first network, DNS requests forwarded onto the second network should have their addresses changed to an appropriate address for the second network. For example, the destination address of 1.1.1.1 or 2.2.2.2 would be modified to 3.3.3.3 or 4.4.4.4 before forwarding the DNS request onto the second network 110. Data representative of the response is stored so that when a DNS response is received from the second network, the source address of the response (3.3.3.3 or 4.4.4.4) can be changed to the destination address of the original DNS request (1.1.1.1 or 2.2.2.2).

In an example embodiment, when the VPN client 130 encounters a DNS request packet for a sub-domain associated with the second network 110 (e.g., OracleBizApp.company-.com), the VPN client 130 replaces the destination address of the DNS request with a destination address for a DNS server associated with second network 110. The VPN client 130 stores data representative of the request and forwards the request with the destination address for a DNS server associated with the second network to the second network 110 via tunnel 104.

When the VPN client 130 encounters a DNS response packet received from the second network 110 via tunnel 102, the VPN 130 client searches through previously stored data for the DNS request. The VPN client 130 replaces the source address of the DNS response with the destination address of the DNS request that was received by the VPN client 130. The VPN client 130 forwards the DNS response with the original destination address as the source address to the requestor.

In an example embodiment, a first dummy service IP address is associated with the first network coupled with ASA 106 and a second dummy service IP address is associated with the second network 110. The VPN client 130 receives a first packet with the first dummy IP address as a destination address. The VPN client 130 replaces the first dummy IP address with the first service IP address in the response to the first DNS request and forwards the first packet onto the first tunnel 102 with the IP address in the response to the first DNS request as the destination address. The VPN client 130 receives a second packet with the second dummy IP address as a destination address. The VPN client 130 replaces the second dummy IP address with the second service IP address in the response to the second DNS request. The VPN client 130 forwards the second packet onto the second tunnel 104 with the IP address in the response to the second DNS request as the destination address.

Similarly, the VPN client 130 receives a packet from the first tunnel 102 with a source address matching the first service IP address. The VPN client 130 replaces the source address of the packet received from the first tunnel 102 with the first dummy IP address and forwards the first packet with the first dummy IP address as the source address. The VPN client 130 receives a packet from the second tunnel 104 with a source address matching the second service IP address. The VPN client 130 replaces the source address of the second packet with the second dummy IP address and forwards the second packet with the second dummy IP address as the source address.

In an example embodiment, the VPN client 130 forwards DNS requests for sub-domains that are not associated to one of tunnels 102 or 104 to a DNS server on the home network. The DNS requests are forwarded unmodified. When a response is received for the DNS request for a sub-domains that are not associated to one of tunnels 102 or 104, the DNS response is forwarded unmodified and the VPN client does not associate a dummy service IP address to the address in the DNS response. Thus, the route table 128 will route traffic for non-tunneled networks to IP interface 132.

Figure 2B:
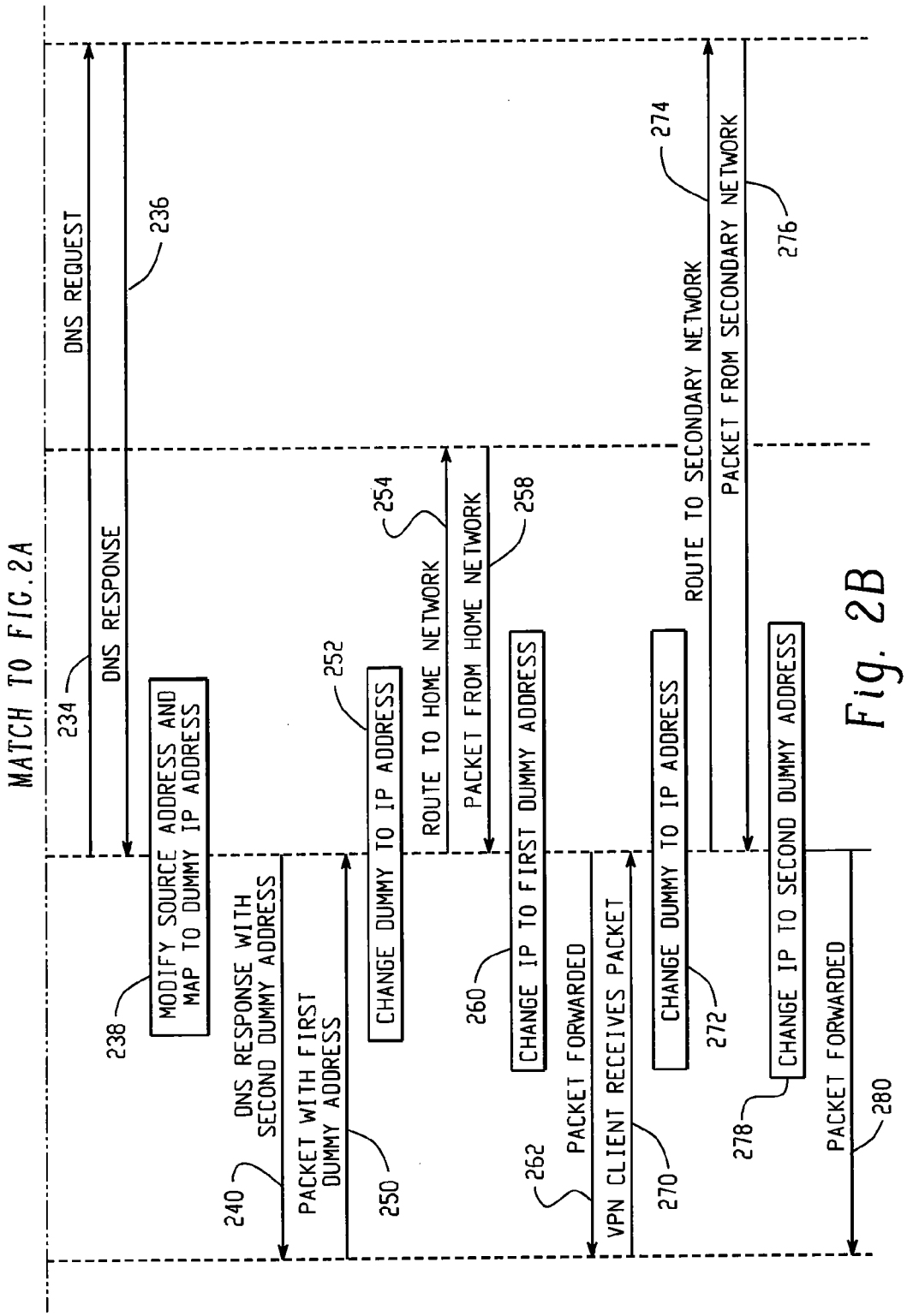

FIG. 2A and FIG. 2B illustrate an example of a simplified signal diagram 200 for implementing dynamic split tunneling to multiple data centers. For simplicity, a single line may be employed where multiple signals are exchanged. In the illustrated example, an application 202 is communicatively coupled to VPN client 130.

At 204 the VPN client 130 establishes a first VPN tunnel 102 with the home (or headquarters) concentrator (e.g., VPN concentrator or ASA) 106. Note that although the illustrated example shows a single signal 204 those skilled in the art should readily appreciate that this is a simplified diagram and that a plurality of signals may be exchanged between the VPN client 130 and the home network concentrator 106 to establish the first VPN tunnel 102.

Upon establishing the first VPN tunnel 102, the home network concentrator 106, at 206, provides the VPN client 130's configuration data to one or more other secondary network VPN concentrators. The VPN client configuration data may suitably comprise authentication data and an IP address for the VPN client.

The VPN client 130 obtains FQDNs for sub-domains associated with the home network that are accessible via the home network concentrator 106. The VPN client 130 obtains VPN configuration data for one or more other private (e.g., secondary) networks from the home network concentrator 106. The VPN client 130 employs the VPN configuration data to establish secondary tunnels to secondary networks. For example, at 208, the VPN client 130 establishes a second (secondary) VPN tunnel 104 with the secondary network concentrator 112. Upon establishing the second VPN tunnel 104, at 210, the VPN client 130 obtains data representative of FQDNs associated with the second network 110 accessible through the second network concentrator 112.

At 212, the VPN client 130 configures dummy IP addresses for the FQDNs associated with the first and second networks. As will be illustrated in further detail herein, the dummy addresses are provided to the application 202 by the VPN client 130, and the VPN client 130 performs network address translating to enable to the application (or multiple applications) 202 to communicate with sub-domains on multiple VPN tunneled networks.

At 220, a first DNS request is received by the VPN client 130 from the application 202. The VPN client determines that the first DNS request is for a sub-domain associated with the first network and thus, at 222, forwards the DNS request unmodified to the home network concentrator 106 via tunnel 102. At 224, a response to the DNS request is sent by the home network concentrator 106 to the VPN client 130. At 226 the VPN client 130 maps the service IP in the response to a (first) dummy service IP address, and replaces the service IP address in the response with the first dummy service IP address. At 228, the DNS response with the first dummy service IP address is forwarded to the application 202.

At 230, the application 202 sends a second DNS request to the VPN client 130. The VPN client 130 determines that the second DNS request is for a sub-domain associated with the second network 110. The VPN client 232 modifies the destination of the DNS request to match a DNS server on the second network 110 and stores data representative of the second DNS request. At 234, the modified second DNS request is forwarded to the second network concentrator 112 via tunnel 104. At 236, a response to the second DNS request (second DNS response) is received by the VPN client from the second network concentrator 112. At 238, the VPN client 130 maps the service IP address in the response (second service IP address) to a second dummy service IP address and modifies the response accordingly. In addition, the VPN client 130 matches the second DNS response with the second DNS stored previously (at 232), and changes the source address in the response to the destination address of the original DNS request sent at 230. At 240, the DNS response with the second dummy service IP address and the modified source address is sent to the application 202.

At 250, the VPN client 130 receives a packet from the application 202 with the first dummy service IP address as the destination address. At 252, the VPN client 130 determines that the first dummy service IP address maps to the first service IP address and accordingly modifies the destination address of the packet to match the first service IP address. At 254, the packet is forwarded with the first service IP address to the home network concentrator 106 via tunnel 102.

At 258, the VPN client 130 receives a packet from the home (or headquarters) network via home network concentrator 106 and tunnel 102. At 260, the VPN client 130 determines that the destination service IP address in the packet maps to the first dummy service IP address, and changes the destination address of the packet to the first dummy service IP address. At 262, the packet with the first dummy service IP address as the destination address is forwarded to the application 202.

At 270, the VPN client 130 receives a packet from the application 202 with the second dummy service IP address as the destination address. At 272, the VPN client 130 determines that the second dummy service IP address maps to the second service IP address and accordingly modifies the destination address of the packet to match the second service IP address. At 274, the packet is forwarded with the second service IP address to the second network concentrator 112 via tunnel 104.

At 276, the VPN client 130 receives a packet from the second (or secondary) network via second network concentrator 112 and tunnel 104. At 278, the VPN client 130 determines that the destination service IP address in the packet maps to the second dummy service IP address, and changes the destination address of the packet to the second dummy service IP address. At 280, the packet with the second dummy service IP address as the destination address is forwarded to the application 202.

FIG. 3 illustrates an example of a computer system 300 upon which an example embodiment can be implemented. Computer system 300 may be employed to implement the functionality of the virtual, VPN adapter 128 described in FIG. 1.

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, and/or flash storage, is provided and coupled to bus 302 for storing information and instructions.

An aspect of the example embodiment is related to the use of computer system 300 for implementing application services based on dynamic split tunneling to multiple data centers. According to an example embodiment, implementing application services based on dynamic split tunneling to multiple data centers is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, and volatile media. Non-volatile media include for example optical or magnetic disks, such as storage device 310. Volatile media include dynamic memory such as main memory 306. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes a communication interface 318 coupled to bus 302. Communication interface 318 provides a two-way data communication coupling computer system 300 to a network link 320 for communicating with networks employing dynamic split tunneling to multiple data centers.

For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information.

In view of the foregoing structural and functional features described above, methodologies in accordance with an example embodiments will be better appreciated with reference to FIGS. 4-8. While, for purposes of simplicity of explanation, the methodologies of FIGS. 4-8 are shown and described as executing serially, it is to be understood and appreciated that the example embodiment is not limited by the illustrated orders, as some aspects could occur in different orders and/or concurrently with other aspects from that shown and described herein. Moreover, not all illustrated features may be required to implement the methodologies described herein. The methodology described herein is suitably adapted to be implemented in hardware, software when executed by a processor, or a combination thereof.

FIG. 4 illustrates an example of a methodology 400 for deploying VPN concentrators. At 402, the concentrators (e.g., VPN concentrators and/or Adaptive Security Appliances are deployed. The concentrators may be deployed at one or more data centers. For example, a first concentrator may be deployed at a first predefined data center (such as at a company's headquarters or home network) and additional concentrators may be deployed at other data centers (for example a second concentrator at a second data center).

At 404, the concentrators are configured with the addresses of the other concentrators. The other concentrators may include concentrators at the headquarters data center, other private networks, and/or other data centers.

At 406, the concentrators are configured with Fully Qualified Domain Names (FQDNs) associated with the services offered by their respective data centers (e.g., finances.company.com, BizApp.company.com). The FQDNs are passed to VPN clients responsive to the establishment of VPN tunnels.

FIG. 5 illustrates an example of a methodology 500 for establishing dynamic split tunnels to multiple data centers. Acts 502, 504, and 508 of the methodology 500 may be performed by the VPN client described in FIG. 1 and/or the computer system 300 described in FIG. 3. Act 504 may be performed by the home network concentrator 106 in FIG. 3 and/or by the computer system 300 described in FIG. 3.

At 502, the VPN client initiates a VPN tunnel with the main (e.g., home network or headquarters) concentrator.

At 504, the VPN client obtains FQDNs associated with the home network. The VPN client also obtains the VPN configuration with comprises configuration data for one or more other concentrators at other private cloud data centers.

At 506, the main concentrator propagates VPN session data, such as authentication data, to the other concentrators. The main concentrator may also provide the client IP address (e.g., an IP address that will be assigned to the VPN adapter on the client host).

At 508, the VPN client initiates a VPN tunnel with peer concentrators that were received in the VPN configuration from the main concentrator. In particular embodiments, because the peer concentrators already have the VPN session authentication information (received from the main concentrator at 504), no further user driven authentication is performed. For example, the VPN client can provide a token for SSO.

At 510, the VPN client receives a configuration containing the service FQDNs associated with the peers' respective private cloud data center application services. As described in more detail herein, the VPN client can assign dummy IP addresses corresponding to the FQDNs to provide dynamic split tunneling to multiple datacenters.

Figure 6:
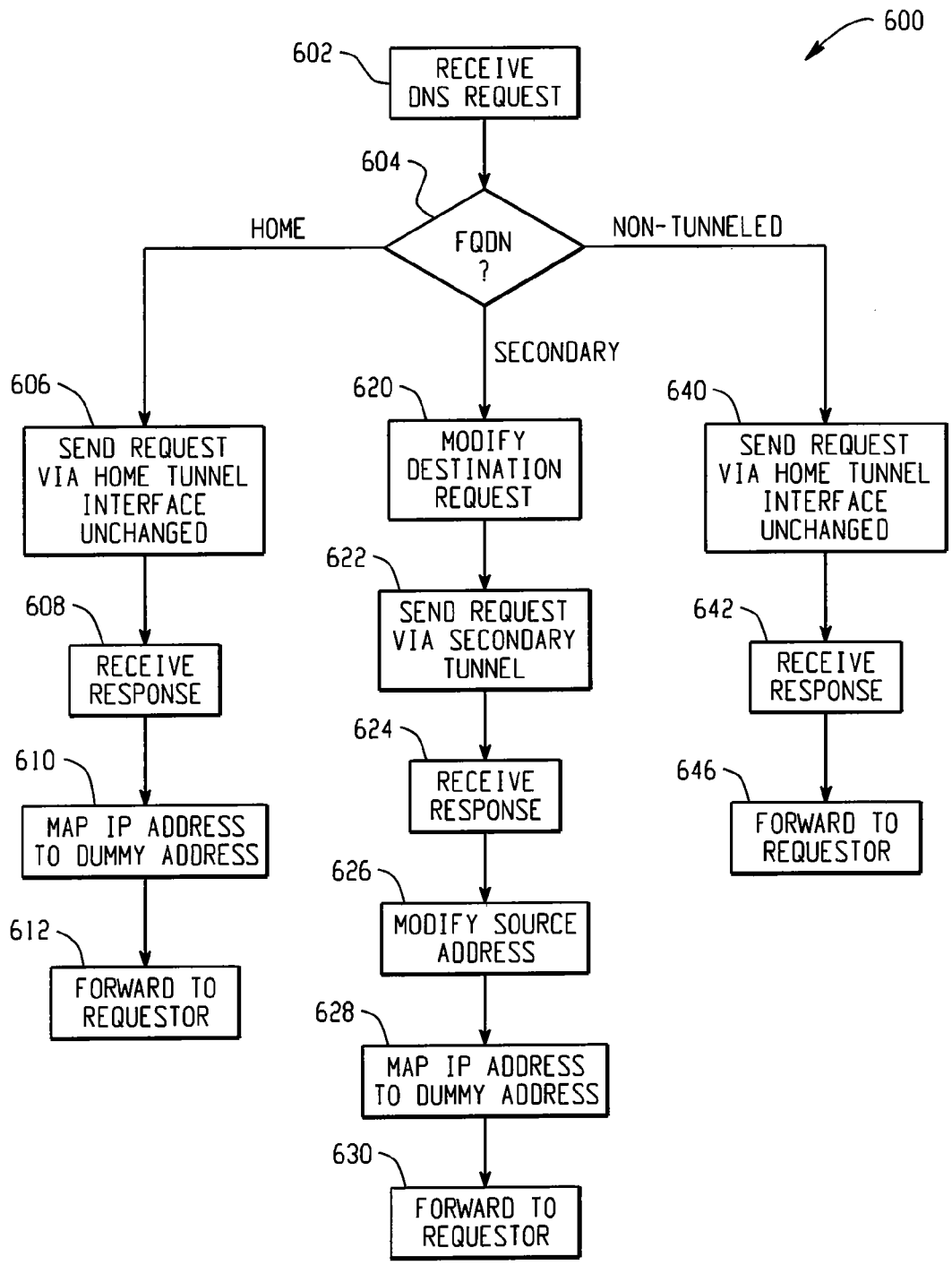
FIG. 6 illustrates an example of a methodology for handling DNS requests and responses for split tunneling to multiple data centers.

FIG. 6 illustrates an example of a methodology 600 for handling DNS requests and responses for split tunneling to multiple data centers. Methodology 600 may be implemented by VPN client 130 described in FIG. 1 and/or by computer system 300 described in FIG. 3.

At 602, the VPN client receives a DNS request. The DNS request may be received from an application communicatively coupled with the VPN client.

At 604, the VPN client looks up the FQDN in the request. The VPN client determines whether the request is for a FQDN that was received from the home concentrator or from one of the other peer concentrators.

If, at 604, the VPN client determines that the request is for a FQDN associated with the home network (HOME), at 606 the request is forwarded to the main concentrator. The request is forwarded unchanged.

At 608, a response to the DNS is received from the main concentrator. The VPN client maps a dummy service IP address to the service IP address in the response. The VPN client then modifies the DNS response, providing the dummy service IP address in the response. The modified is provided to the requestor (e.g., the requesting application) at 612.

If, at 604, the VPN client determines that the request is associated with a FQDN associated with one of the other (secondary) private networks (SECONDARY), at 620 the destination address of the DNS request is modified. The destination address is changed to a destination address for a DNS server coupled with the appropriate secondary network. A mapping between the original DNS request and the modified DNS request is stored.

At 622, the modified DNS request is sent via a secondary tunnel to the appropriate secondary network. At 624, a response to the DNS request (e.g., a DNS response) is received. The VPN client looks up the previously stored mapping data (stored at 620), and modifies the source address of the DNS response to match the destination address of the original DNS request.

At 628, the service IP address in the DNS response is mapped to a dummy service IP address, and the DNS response is modified accordingly. At 630, the DNS response with the dummy service IP address is forwarded to the requestor (e.g., the requesting application).

If, at 604, the VPN client determines that the DNS request is not for a FQDN associated with the main or one of the other secondary private networks (NON-TUNNELED), at 640, the request is forwarded on the home tunnel interface unchanged. At 640, a response to the DNS request (a DNS response) is received. Because the DNS request was for a non-tunneled sub-domain, the DNS response is forwarded to the requestor unchanged. Thus, traffic to the sub-domain in the DNS response can be routed to a public network without passing through the VPN client.

FIG. 7 illustrates an example of a methodology 700 for processing a packet received from an application destined to a tunneled network. The methodology 700 may be implemented by the VPN client 130 described in FIG. 1 and/or the computer system 300 described in FIG. 3.

At 702, a packet with a dummy IP address that is mapped to a tunneled (e.g., the home or a secondary private network) is received. At 704, the appropriate tunneled network is determined based on the dummy IP address. At 706, the dummy IP address is replaced with the appropriate IP address. At 708, the packet is routed with the appropriate IP address on the appropriate tunnel for the private network associated with the IP address.

FIG. 8 illustrates an example of a methodology 800 for processing a packet received from a tunneled network. The methodology 800 may be implemented by the VPN client 130 described in FIG. 1 and/or the computer system 300 described in FIG. 3.

At 802, a packet is received from a tunnel (e.g., either the primary tunnel coupled with the main concentrator or from a tunnel coupled with one of the other private networks). The mapping for the source address is employed to determine the appropriate dummy IP address associated with the source address. At 804, the source address is replaced with the appropriate dummy IP address. At 806, the packet with the dummy IP address is forwarded.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. Logic encoded in a tangible, non-transitory computer readable medium for execution by a hardware processor, and when executed operable to:
   obtain data representative of a first fully qualified domain name (FQDN) corresponding to a first service and associated with a first network;
   receive virtual private network (VPN) configuration data from a security device associated with the first network and a second network;
   dynamically create a first tunnel solely for routing traffic directed to the first FQDN;
   route traffic directed to the first FQDN onto the first tunnel that is dynamically created using the VPN configuration data; and
   route traffic not directed to the first FQDN elsewhere.

2. The logic encoded in the tangible, non-transitory computer readable medium set forth in claim 1, further operable to:
   allocate a first dummy service Internet Protocol (IP) address corresponding to the first FQDN;
   obtain data representative of a second FQDN corresponding to a second service and associated with the second network;
   dynamically create a second tunnel solely for routing traffic directed to the second FQDN; and
   allocate a second dummy service IP address corresponding to the second FQDN.

3. The logic encoded in the tangible, non-transitory computer readable medium set forth in claim 2, further operable to:
   intercept a first Domain Name System (DNS) request for a sub-domain associated with the first FQDN;
   forward the first DNS request onto the first tunnel;
   receive a response to the first DNS request, the response comprising a first service IP address associated with the first network;
   map the first service IP address in the response to the first DNS request to a first dummy service IP address allocated to the first FQDN associated with the first tunnel;
   replace the first service IP address in the response to the first DNS request with the first dummy service IP address;
   forward the response to the first DNS request with the first dummy service IP address;
   intercept a second Domain Name System (DNS) request for a sub-domain associated with the second FQDN;
   forward the second DNS request onto the second tunnel;
   receive a response to the second DNS request, the response comprising a second service IP address associated with the second network;
   map the second service IP address in the response to the second DNS request to a second dummy service IP address allocated to the second FQDN;
   replace the second service IP address in the response to the first DNS request with the second dummy service IP address; and
   forward the response to the second DNS request with the second dummy service IP address.

4. The logic encoded in the tangible, non-transitory computer readable medium set forth in claim 3, wherein the second DNS request comprises a destination address, the logic is further operable to:
   obtain data representative of an address of a DNS server associated with the second network;
   modify the destination address of the second DNS request, the destination address is changed to match the address of the DNS server associated with the second tunnel; and
   store data representative of the second DNS request, the data representative of the second DNS comprises the destination address of the second DNS request;
   wherein the modified second DNS request forwarded on the second tunnel contains the address of the DNS server associated with the second network as the destination address.

5. The logic encoded in the tangible, non-transitory computer readable medium set forth in claim 4, wherein the second DNS response comprises a source address, the logic is further operable to:
   match the response to the second DNS request to the stored data representative of the second DNS request;
   modify the source address of the response to the second DNS request, wherein the source address is modified to match the destination address of the second DNS request; and
   forward the modified response to the second DNS request.

6. The logic encoded in the tangible, non-transitory computer readable medium set forth in claim 3, further operable to:
receive a first packet, the first packet having the first dummy service IP address as a destination address;
replace the first dummy service IP address with the first service IP address in the response to the first DNS request;
forward the first packet onto the first tunnel with the first service IP address in the response to the first DNS request as the destination address;
receive a second packet, the second packet having the second dummy service IP address as a destination address;
replace the second dummy service IP address with the second service IP address in the response to the second DNS request; and
forward the second packet onto the second tunnel with the second service IP address in the response to the second DNS request as the destination address.

7. The logic encoded in the tangible, non-transitory computer readable medium set forth in claim 3, further operable to:
receive a first packet from the first tunnel with a source address matching the first service IP address in the response to the first DNS request;
replace the source address of the first packet with the first dummy service IP address;
forward the first packet with the first dummy service IP address as the source address;
receive a second packet from the second tunnel with a source address matching the second service IP address in the response to the second DNS request;
replace the source address of the second packet with the second dummy service IP address; and
forward the second packet with the second dummy service IP address as the source address.

8. The logic encoded in the tangible, non-transitory computer readable medium set forth in claim 3, further operable to:
intercept a third Domain Name System (DNS) request for a sub-domain not associated with the first FQDN and not associated with a second FQDN;
forward the third DNS request onto the first tunnel;
receive a response to the third DNS request, the response comprising a third service IP address; and
forward the response to the third DNS request with the third service IP address.

9. The logic encoded in the tangible, non-transitory computer readable medium set forth in claim 1, further operable to:
establish the first tunnel with the security device associated with the first network;
wherein the configuration data is obtained upon establishment of the first tunnel.

10. The logic encoded in the tangible, non-transitory computer readable medium set forth in claim 9, further operable to
establish a second tunnel with the second network employing the VPN configuration data received from the security device;
wherein the data representative of a second FQDN is obtained from the second network.

11. A computer implemented method, comprising:
receiving virtual private network (VPN) configuration data from a security device associated with a first network and a second network;
dynamically creating a plurality of tunnels for routing Domain Name System (DNS) requests;
selectively routing DNS requests for sub-domains associated with the first network through a first tunnel associated with the first network;
selectively routing DNS requests for sub-domains associated with the second network through a second tunnel associated with the second network;
associating service Internet Protocol (IP) addresses for sub-domains associated with the first and second networks to dummy service IP addresses;
replacing the service IP addresses in DNS responses for sub-domains associated with the first and second networks with the dummy service IP addresses; and
forwarding the DNS responses with the dummy service IP addresses.

12. The computer implemented method set forth in claim 11, further comprising:
replacing the destination address for DNS requests for sub-domains associated with the second network to match an address of a DNS server associated with the second network;
storing data representative of DNS requests for sub-domains associated with the second network;
forwarding the DNS requests for sub-domains associated with the second network with the address of the DNS server associated with the second network;
matching DNS responses received from the second network with stored DNS request employing the stored data representative of DNS requests;
replacing the source address of the DNS responses with the destination addresses of the DNS requests; and
forwarding the DNS responses with the destination addresses of the DNS requests.

13. The method set forth in claim 11, further comprising:
replacing a destination address of packets having a dummy service IP addresses associated with the first network as the destination address with the appropriate service IP address for the first network;
forwarding the packets with the appropriate service IP address as the destination address for the first network to the first network via the first tunnel;
replacing a destination address of packets having a dummy service IP addresses associated with the second network as the destination address with the appropriate service IP address for the first network;
forwarding the packets with the appropriate service IP address for the second network as the destination address to the second network via the second tunnel;
replacing a source address of packets received from the first network with a dummy service IP addresses associated with the first network;
forwarding the packets with the dummy service IP address associated with the first network as the source address;
replacing a source address of packets received from the second network with a dummy service IP addresses associated with the second network; and
forwarding the packets with the dummy service IP address associated with the second network as the source address.

14. A network device comprising:
a hardware processor; and
logic operable to:
obtain data representative of a first fully qualified domain name (FQDN) corresponding to a first service and associated with a first network;

receive virtual private network (VPN) configuration data from a security device associated with the first network and a second network;
dynamically create a first tunnel solely for routing traffic directed to the first FQDN;
route traffic directed to the first FQDN onto the first tunnel that is dynamically created using the VPN configuration data; and
route traffic not directed to the first FQDN elsewhere.

15. The network device of claim 14, wherein the logic is further operable to:
allocate a first dummy service Internet Protocol (IP) address corresponding to the first FQDN;
obtain data representative of a second FQDN corresponding to a second service and associated with the second network;
dynamically create a second tunnel solely for routing traffic directed to the second FQDN; and
allocate a second dummy service IP address corresponding to the second FQDN.

16. The network device of claim 15, wherein the logic is further operable to:
intercept a first Domain Name System (DNS) request for a sub-domain associated with the first FQDN;
forward the first DNS request onto the first tunnel;
receive a response to the first DNS request, the response comprising a first service IP address associated with the first network;
map the first service IP address in the response to the first DNS request to a first dummy service IP address allocated to the first FQDN associated with the first tunnel;
replace the first service IP address in the response to the first DNS request with the first dummy service IP address;
forward the response to the first DNS request with the first dummy service IP address;
intercept a second Domain Name System (DNS) request for a sub-domain associated with the second FQDN;
forward the second DNS request onto the second tunnel;
receive a response to the second DNS request, the response comprising a second service IP address associated with the second network;
map the second service IP address in the response to the second DNS request to a second dummy service IP address allocated to the second FQDN;
replace the second service IP address in the response to the first DNS request with the second dummy service IP address; and
forward the response to the second DNS request with the second dummy service IP address.

17. The network device of claim 16, wherein the logic is further operable to:
obtain data representative of an address of a DNS server associated with the second network;
modify the destination address of the second DNS request, the destination address is changed to match the address of the DNS server associated with the second tunnel; and
store data representative of the second DNS request, the data representative of the second DNS comprises the destination address of the second DNS request;
wherein the modified second DNS request forwarded on the second tunnel contains the address of the DNS server associated with the second network as the destination address.

18. The network device of claim 17, wherein the logic is further operable to:
match the response to the second DNS request to the stored data representative of the second DNS request;
modify the source address of the response to the second DNS request, wherein the source address is modified to match the destination address of the second DNS request; and
forward the modified response to the second DNS request.

19. The network device of claim 16, wherein the logic is further operable to:
receive a first packet, the first packet having the first dummy service IP address as a destination address;
replace the first dummy service IP address with the first service IP address in the response to the first DNS request;
forward the first packet onto the first tunnel with the first service IP address in the response to the first DNS request as the destination address;
receive a second packet, the second packet having the second dummy service IP address as a destination address;
replace the second dummy service IP address with the second service IP address in the response to the second DNS request; and
forward the second packet onto the second tunnel with the second service IP address in the response to the second DNS request as the destination address.

20. The network device of claim 16, wherein the logic is further operable to:
receive a first packet from the first tunnel with a source address matching the first service IP address in the response to the first DNS request;
replace the source address of the first packet with the first dummy service IP address;
forward the first packet with the first dummy service IP address as the source address;
receive a second packet from the second tunnel with a source address matching the second service IP address in the response to the second DNS request;
replace the source address of the second packet with the second dummy service IP address; and
forward the second packet with the second dummy service IP address as the source address.

21. The network device of claim 16, wherein the logic is further operable to:
intercept a third Domain Name System (DNS) request for a sub-domain not associated with the first FQDN and not associated with a second FQDN;
forward the third DNS request onto the first tunnel;
receive a response to the third DNS request, the response comprising a third service IP address; and
forward the response to the third DNS request with the third service IP address.

* * * * *